United States Patent [19]
Haruna

[11] 3,736,004
[45] May 29, 1973

[54] VEHICULAR SAFETY DEVICE
[75] Inventor: Takashi Haruna, Yokosuka, Japan
[73] Assignee: Nissan Motor Company, Limited, Yokohama City, Japan
[22] Filed: Apr. 29, 1971
[21] Appl. No.: 138,528

[30] Foreign Application Priority Data
May 4, 1970 Japan..........................45/38098

[52] U.S. Cl................280/150 AB, 161/68, 180/90, 280/150 B
[51] Int. Cl.....................B60r 21/04, B60r 21/08
[58] Field of Search...................280/150 AB, 150 B; 180/90; 161/68

[56] References Cited
UNITED STATES PATENTS
3,514,124  5/1970  Richardson...............280/150 AB
3,224,924  12/1965  Ardenne et al..............180/90 X
2,369,006  2/1945  Banks........................161/68 X
3,462,330  8/1969  Greig et al..................161/68 X Primary Examiner—Leo Friaglia
Assistant Examiner—John P. Silverstrim
Attorney—McCarthy, Depaoli, O'Brien & Price

[57] ABSTRACT

An improvement is made on a vehicular safety device using an inflatable confinement which is expanded to a protective condition when a collision is encountered by a motor vehicle. The improvement comprises a shock-absorptive structure which is located within the inflatable confinement and receives a vehicle occupant in the event the vehicle occupant is flung to the inflatable confinement before the confinement is fully expanded to the protective condition. The vehicle occupant is thus protected from being forced against structural parts of a cabin of the motor vehicle even when the confinement which is being expanded and caused to cave in by the force of inertia in the vehicle occupant subjected to the impact.

3 Claims, 3 Drawing Figures

VEHICULAR SAFETY DEVICE

This invention relates generally to a safety device for a motor vehicle and specifically to a motor vehicle safety device of the character which is adapted to protect a vehicle occupant from collision with structural parts in a cabin of the motor vehicle in the event the motor vehicle is subjected to a sudden impact as in a collision with a moving or stationary obstruction during cruising. The safety device dealt with by this invention has an inflatable confinement which is frequently called the air bag. The inflatable confinement is normally stored in a folded or collapsed condition in the motor vehicle and is expanded to a protective condition immediately when the sudden impact is applied to the motor vehicle. The expanded inflatable confinement is projected to a position intervening between the structural parts of the vehicle cabin and the vehicle occupant so that the occupant is prevented from being flung to and striking against the structural parts. The occupant is thus protected from injury otherwise resulting from the collision. For the reliable and timely operation of the safety device of this type, it is of critical importance that the inflatable confinement be expanded substantially instantaneously when the collision is encountered. Experiments have revealed that the inflatable confinement should be fully expanded in about 60 micro-seconds after the collision has been encountered. Such instantaneous expansion of the inflatable confinement is effected by forcing a pressurized fluid (which is usually a gas under pressure) into the inflatable confinement in the folded condition under the control of means detecting the impact applied to the motor vehicle. This pressurized fluid is supplied either from a container storing the pressurized fluid or by a pressurized gas producing medium which is stored internally of the inflatable confinement per se and which is activated to produce a pressurized gas when combusted. Difficulties are, however, experienced in supplying the pressurized fluid into the inflatable confinement substantially instantaneously until a desired pressure is built up in the confinement which usually has a considerably large capacity in the protective condition. If the inflatable confinement fails to be fully expanded to the protective position before the vehicle occupant is flung thereto, then the inflatable confinement will be caused to sink or cave inwardly to such an extent as not to be capable of securely preventing the vehicle occupant from striking against the structural parts of the vehicle cabin through the confinement, thus causing an injury to the vehicle occupant.

It is, therefore, an object of this invention to provide an improved vehicular safety device of the described type which is adapted to reliably protect the vehicle occupant from injury in the event of a collision of the motor vehicle.

It is another object of this invention to provide an improved vehicular safety device of the described type by which the vehicle occupant is protected from striking structural parts of the vehicle cabin even though the inflatable confinement is in the process of being expanded to the protective condition when the collision of the vehicle is encountered.

To achieve these and other objects, it is herein proposed to have a shock-absorptive structure in the inflatable confinement. When a load, which in this instance is a force of inertia in the vehicle occupant flung to the confinement, is applied to the inflatable confinement before the confinement is fully expanded to the protective condition in the event of the collision, the shock-absorptive structure then carries the load so that the vehicle occupant, is prevented from striking against the structural parts of the vehicle cabin. The shock-absorptive structure may be a unitary honeycomb member consisting of a plurality of elastic hollow tubular elements which are secured together in parallel to each other and substantially at right angles to the direction in which the load is possibly applied thereto. Where the safety device is of the type in which the inflatable confinement is expanded by a pressurized gas which is produced by a pressurized gas producing medium stored in the confinement itself, the medium may be stored or enclosed in at least some of the hollow tubular elements making up the honeycomb member. In this instance, explosives are mounted and in contact with at both ends of the honeycomb member and are fired to expand the inflatable confinement when the impact is applied to the motor vehicle. Where, on the other hand, the safety device has a container storing a pressurized gas and located independently of the inflatable confinement, the hollow tubular elements may be left hollowed.

Preferred embodiments of this invention are now shown in the accompanying drawings, in which.

Figure 1:
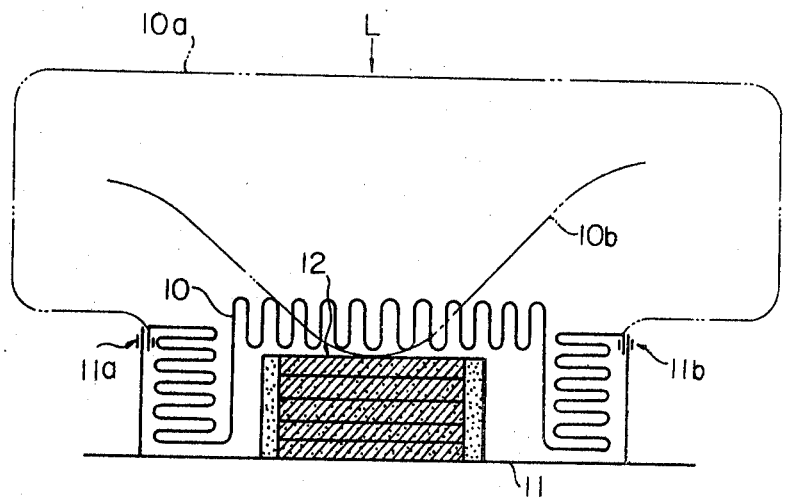
FIG. 1 is a schematic sectional view showing a first preferred embodiment of this invention in which the safety device is of the type in which the confinement is expanded by a pressurized gas produced therein.

Reference is first had to FIG. 1, in which only those parts of the safety device which are necessary for the understanding of this invention are shown for simplicity of illustration. The safety device thus includes an inflatable confinement 10 which has a folded or stored condition as indicated by solid lines and an expanded or protective condition as indicated by 10a in phantom lines. The confinement 10 is secured to a suitable support member 11 as at 11a and 11b, which member is held substantially stationary relative to the vehicle body (not shown). According to this invention, now, a shock-absorptive structure which is generally designated by reference numeral 12 is located inside the inflatable confinement 10. The shock-absorptive structure 12 is held stationary relative to the vehicle body and may be secured to the support member 11 for the inflatable confinement. A preferred example of the construction of this shock-absorptive structure 12 is illustrated in FIG. 2.

Figure 2:
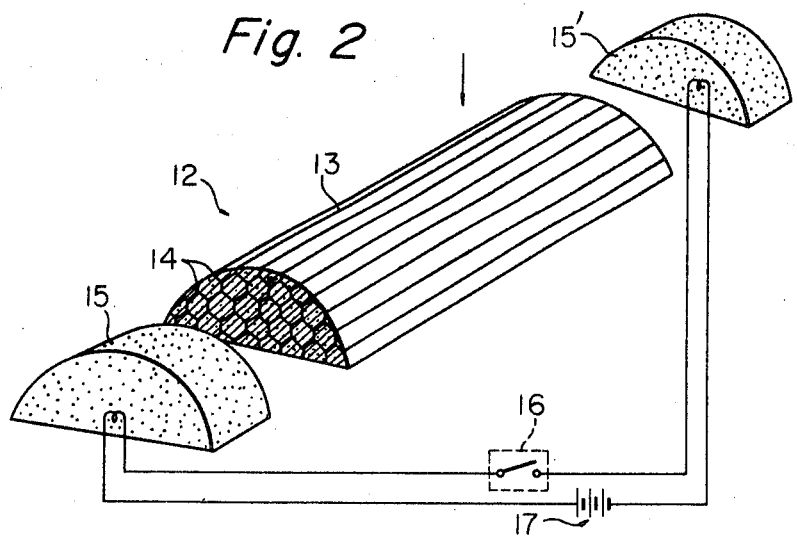
FIG. 2 is a partly exploded perspective view showing an example of the shock-absorptive structure for use in the embodiment of FIG. 1.

As seen in FIG. 2, the shock-absorptive structure 12 is a honeycomb member consisting of a plurality of elastic hollow tubular elements which are denoted by a common reference numeral 13. The hollow tubular elements 13 are secured together in parallel to each other and substantially at right angles to the direction of arrow L in which a load, which is actually a force of inertia in the vehicle occupant flung to the expanded confinement and which is applied to the inflatable confinement 10 in the expanded condition 10a. All or some of the tubular elements 13 have stored therein a pressurized gas producing medium 14 which is adapted to produce a pressurized gas when combusted. A pair of explosive means 15 and 15' are mounted at and in contact with both ends of the honeycomb member 12. These explosive means 15 and 15' are caused to fire the pressurized gas producing medium 14 to produce the pressurized gas when the explosive means are actuated. The explosive means 14 and 14' are actuated by a suitable actuating means which is operatively connected thereto and which is herein shown to comprise an electric circuit having a switch 16 and a source 17 of electric power. The switch 16 is arranged so as to be closed when a sudden impact is detected thereby so that the electric circuit is completed and the explosive means 14 and 14' are fired when a collision is encountered by the motor vehicle. The pressurized gas is thus produced in the inflatable confinement 10 which is consequently expanded from the stored condition to the protective conditon 10a so as to receive the load or the vehicle occupant who is flung to the expanded confinement in the direction of the arrow L.

If, at this instant, the inflatable confinement 10 fails to be fully expanded before the vehicle occupant is flung thereto in the event of a collision of the motor vehicle, then the confinement 10 which is still in the process of expansion is forced to sink inwardly as indicated by reference numeral 10b in FIG. 1 with the result that the vehicle occupant is caused to be brought into contact with the shock-absorptive structure 12 through the sunk portion 10b of the confinement 10. The mechanical shock transferred to the vehicle occupant is in this manner consumed in an elastic deformation of the shock-absorptive structure 12. The tubular elements 13 forming this shock-absorptive structure 12 are, at this instant, completely hollowed with the pressurized gas producing medium 14 used up for the expansion of the confinement 10. The vehicle occupant is thus protected from striking against the structural parts in the vehicle cabin even when the confinement 10 is not fully expanded to the protective condition 10a and caused to cave in to the position 10b.

It is not necessary that the pressurized gas producing medium 14 be stored in all of the tubular elements 13. The medium 14 may be stored only in a limited number of the tubular elements so as to permit these elements to have an increased resilience. In this instance, it is preferable that the medium 14 be stored in those tubular elements which are located on the side of the shock-absorptive structure 12 remote from the load or the force of inertia in the vehicle occupant viz., on the side adjacent the support member 11.

Figure 3:
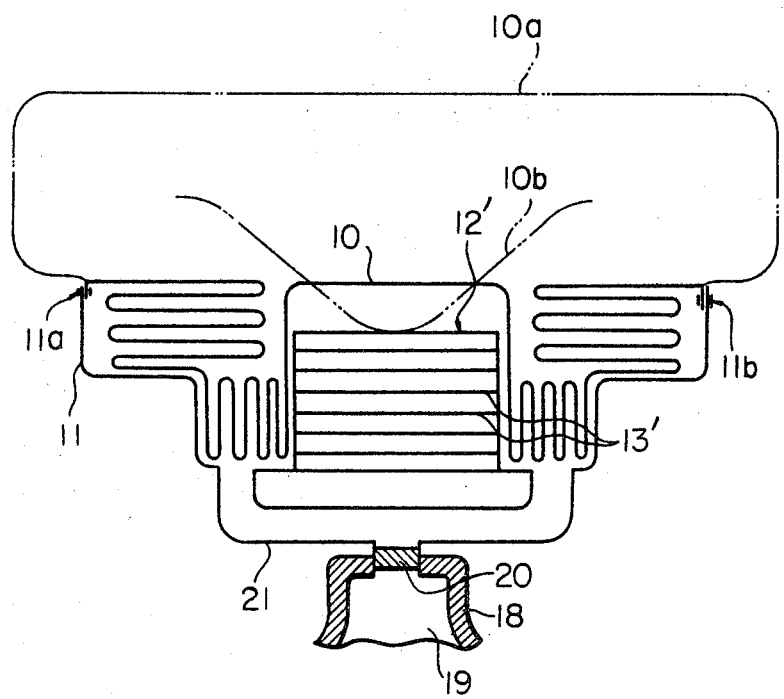
FIG. 3 is similar to FIG. 1 but now shows a second preferred embodiment of this invention in which the safety device is of the type in which the confinement is expanded by a pressurized gas which is stored in the container located separately of the confinement.

FIG. 3 now illustrates an embodiment of this invention as applied to a vehicular safety device in which the inflatable confinement 10 is expanded during collision of the motor vehicle by a pressurized fluid which is supplied from a container 18 which is located independently of the inflatable confinement 10. The container 18 has stored therein a pressurized fluid 19 and is normally closed by a closure member 20. This closure member 20 is broken in a suitable manner immediately when a sudden impact is applied to the motor vehicle, whereupon the pressurized fluid 19 is allowed into the inflatable confinement 10 through a passage 21 so as to have the confinement 10 expanded to the protective condition 10a. The shock-absorptive structure which is now denoted by reference numeral 12' is constructed essentially similarly to the structure 12 in FIGS. 1 and 2, made up of a plurality of elastic hollow tubular elements 13' which are secured together in a manner previously described. These tubular elements 13' are all completely hollowed and are void of the pressurized gas producing medium as is the case with the tubular elements 13 of FIGS. 1 and 2. The operation and function of the arrangement herein shown are essentially analogous to those of the arrangement previously discussed and, as such, discussion thereon is now omitted.

What is claimed is:

1. In a safety device for a motor vehicle having an inflatable confinement which is stored in a collapsed condition and which is expanded to a protective condition by a pressurized fluid immediately when the motor vehicle encounters a collision, the improvement comprising a shock-absorptive structure which is located internally of said inflatable confinement for carrying a load when the load is applied to said inflatable confinement before the inflatable confinement is fully expanded to said protective condition, said shock-absorptive structure including a unitary honeycomb member consisting of a plurality of elastic hollow tubular elements which are secured together substantially at right angles to a direction in which said load is supplied to said inflatable confinement, a pressurized gas producing medium which is stored in at least some of said tubular elements, and a pair of explosive means which are mounted at and in contact with both ends of said honeycomb member and which are fired to cause said medium to produce a pressurized gas for expanding said inflatable confinement to said protective position when said impact is applied to said motor vehicle.

2. The improvement according to claim 1, in which said pressurized gas producing medium is stored in a limited number of the tubular elements.

3. The improvement according to claim 2, in which said pressurized gas producing medium is stored in those tubular elements which are located on the side of said structure remote from said load.

* * * * *